(12) United States Patent
Matsuzaki

(10) Patent No.: US 8,344,644 B2
(45) Date of Patent: Jan. 1, 2013

(54) ELECTRONIC BALLAST FOR HID LAMPS WITH ACTIVE LAMP POWER CONTROL

(75) Inventor: Nobutoshi Matsuzaki, Neyagawa (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 12/765,319

(22) Filed: Apr. 22, 2010

(65) Prior Publication Data

US 2010/0270938 A1  Oct. 28, 2010

(30) Foreign Application Priority Data

Apr. 22, 2009 (JP) ................................ 2009-104493

(51) Int. Cl.
*H05B 41/26* (2006.01)

(52) U.S. Cl. ........ 315/287; 315/224; 315/246; 315/291; 315/297; 315/307; 315/326; 315/360

(58) Field of Classification Search .................. 315/287, 315/291, 307
See application file for complete search history.

(56) References Cited

U.S. PATENT DOCUMENTS

| | | | | |
|---|---|---|---|---|
| 4,585,974 A | * | 4/1986 | Stupp et al. | 315/307 |
| 6,008,592 A | * | 12/1999 | Ribarich | 315/225 |
| 6,140,771 A | * | 10/2000 | Luger et al. | 315/101 |
| 6,429,603 B1 | * | 8/2002 | Tsugita et al. | 315/224 |
| 7,199,528 B2 | * | 4/2007 | Quazi | 315/247 |
| 7,247,998 B2 | * | 7/2007 | Poehlman et al. | 315/291 |
| 7,378,807 B2 | * | 5/2008 | Feldtkeller et al. | 315/308 |
| 2007/0296416 A1 | * | 12/2007 | Lee et al. | 324/411 |
| 2009/0021177 A1 | * | 1/2009 | Cho et al. | 315/225 |

FOREIGN PATENT DOCUMENTS

JP   4155798   5/1992

* cited by examiner

*Primary Examiner* — Jacob Y Choi
*Assistant Examiner* — Anthony Arpin
(74) *Attorney, Agent, or Firm* — Waddey & Patterson, P.C.; Mark J. Patterson; Mark A. Pitchford

(57) ABSTRACT

An electronic ballast includes a ballast control circuit controlling an inverter circuit to supply a rectangular wave AC power to a high-pressure discharge lamp. The ballast control circuit includes a load voltage detection circuit adapted to detect load voltages of both positive and negative polarities applied to the lamp, a comparison and selection circuit adapted to compare the detected load voltages of the positive and negative polarities and select one of the positive and negative polarities, and a switching control circuit adapted to use the load voltage of the polarity selected by the comparison and selection circuit for controlling load current in one cycle after a period of detecting the load voltages of both the positive and negative polarities.

10 Claims, 9 Drawing Sheets

US 8,344,644 B2

ELECTRONIC BALLAST FOR HID LAMPS WITH ACTIVE LAMP POWER CONTROL

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-104493, filed Apr. 22, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to electronic ballasts for powering high-intensity and a high-pressure discharge (HID) lamps such as high-pressure mercury and metal halide lamps, and to lamp fixtures using the same.

More particularly, the present invention pertains to electronic ballasts for HID lamps with circuitry for controlling power provided to the lamp.

FIG. 12 is a schematic of a conventional electronic ballast. The details of the circuit configuration and operation thereof are described later referring to FIG. 1 and the following is merely a summary thereof. In the ballast of FIG. 12, when the output power provided to an HID lamp DL is determined, the load voltage to the lamp DL through is detected by a load voltage detecting circuit 21 as part of a ballast control circuit 2, and is used to provide a prescribed load current according to the monitored value of the load voltage. For example, data according to voltage-current (V-I) characteristic table as shown in FIG. 10 may be stored in a memory 22 in the control circuit 2 so that a load current I is provided according to the detected value of the load voltage V. When determining the load current in this configuration, if the load current values for positive and negative polarities are different in a rectangular wave, this may result in flickering of the discharge lamp DL. Therefore, the detection period of the load voltage is fixed in one of the positive and negative half cycles, so that the load current to be provided in one cycle thereafter is determined according to the detected value of the load voltage.

FIG. 13 conceptually shows waveforms according to conventional detection (reading) of load voltage and a reflection thereof on control of the load current. The detection of the load voltage is fixed in a prescribed period of a positive or negative polarity. In the example shown in FIG. 13, the load voltage detection (reading) operation is fixed in a positive half cycle and the load current to be provided in one cycle thereafter is determined according to the detected value of the load voltage.

In a case where the load voltage is detected in a half cycle of a positive or negative polarity to thereby determine the load current to be provided in one cycle thereafter, as in the conventional example shown in FIG. 13, the ballast is normally operated when the load voltage values of both positive and negative polarities are generally equal. However, when the load voltage values of positive and negative polarities are largely different (for example, in a half-wave discharge or lamp rectification state), the target values of the load currents are different in the positive and negative polarity periods, and therefore a deviation is inevitably caused with respect to a target value of the load current in any one of the polarities. This is due to whether the polarity of the load current to be determined is the same as, or inverse to, the polarity of the monitored or measured load voltage.

As shown in FIG. 14, for example, in the case where the load voltage is detected in a polarity period of lower voltage, the load current in a polarity period thereafter is equal to or greater than a suited value, resulting in that the output power obtained (multiplying load voltage and load current) exceeds a prescribed value. Accordingly, there is concern for failure of the ballast or reduction in life of the lamp.

FIG. 4 shows waveforms of load voltage and load current when power being equal to or greater than prescribed value is actually provided by a ballast for powering a 150 W HID lamp. In FIG. 4, Vla denotes load voltage and Ila denotes load current. In this example, the load voltage is always detected in a positive polarity period and the target value of the load current is determined in the next both positive and negative polarity periods. Thus, the output power is generally equal to the prescribed value in the positive polarity period but is equal to or greater than the prescribed value in the negative polarity period.

In a configuration as disclosed Japanese Patent Publication No. 2815230), a circuit is adapted to disable operation of the ballast when the load current is largely different from a prescribed target value due to lamp rectification. However, in the case of an HID lamp, lamp rectification (a half-wave discharge state) is usually caused at the beginning of a lamp starting operation. In addition, after the lamp is started, it may take several minutes or longer to restart the lamp due to an increase of a gas pressure inside the lamp.

BRIEF SUMMARY OF THE INVENTION

The present invention solves the problems mentioned above and has as one objective, preventing a high-pressure discharge lamp from being started even when the difference between load voltages of positive and negative polarities is large when the lamp is abnormally lighted due to half-wave discharge, and also preventing the supply of output power that is equal to or greater than a prescribed.

According to a first aspect of the present invention, to solve the problems mentioned above, an electronic ballast includes a power supply circuit (inverter circuit) for converting a DC power source to supply rectangular wave AC power to a high-pressure discharge lamp, and a ballast control circuit for controlling the inverter circuit. The ballast control circuit includes a load voltage detection circuit adapted to detect load voltages of both positive and negative polarities applied to the high-pressure discharge lamp DL, a comparison and selection circuit adapted to compare the detected load voltages of the positive and negative polarities and to select one of the positive and negative polarities, and a switching control circuit adapted to respond to the load voltage of the polarity or half-cycle selected by the comparison and selection circuit for controlling the load current in one cycle after the period of detecting the load voltages of both the positive and negative polarities or half-cycles.

According to a second aspect of the present invention, the one cycle after the period of detecting the load voltages of the positive and negative polarities is a period of one cycle immediately after monitoring the load voltages of the positive and negative polarities and selecting any one of the positive and negative polarities.

According to a third aspect of the present invention, the comparison and selection circuit selects one of the polarities so as to decrease the load current determined in accordance with the selected load voltage.

According to a fourth aspect of the present invention, the comparison and selection circuit selects a polarity of a higher one of the load voltages.

According to a fifth aspect of the present invention, the comparison and selection circuit is operated when the load voltages of the positive and negative polarities are equal to or greater than a prescribed value.

According to a sixth aspect of the present invention, the comparison and selection circuit is operated after a prescribed time lapse after the high-pressure discharge lamp is started.

According to a seventh aspect of the present invention, the comparison and selection circuit is operated when a cumulative time period of lighting the high-pressure discharge lamp is equal to or greater than a prescribed time period.

According to an eighth aspect of the present invention, the comparison and selection circuit is operated when the difference between the load voltages of the positive and negative polarities is equal or greater than a prescribed value.

According to a ninth aspect of the present invention, the comparison and selection circuit is operated when the state of the difference between the load voltages of the positive and negative polarities being equal to or greater than the prescribed value is continued for a period equal to or greater than a prescribed time period.

According to a tenth aspect of the present invention, a lamp fixture is provided with a ballast according to any one of the first to ninth aspects.

According to the present invention, because the load voltages of the positive and negative polarities to be applied to a high-pressure discharge lamp are compared to select one of the positive and negative polarities, an appropriate control can be realized even when the load voltages of the positive and negative polarities are largely different. Thus, it is possible to prevent reduction in life of the high-pressure discharge lamp and breakdown of the ballast.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Figure 1:
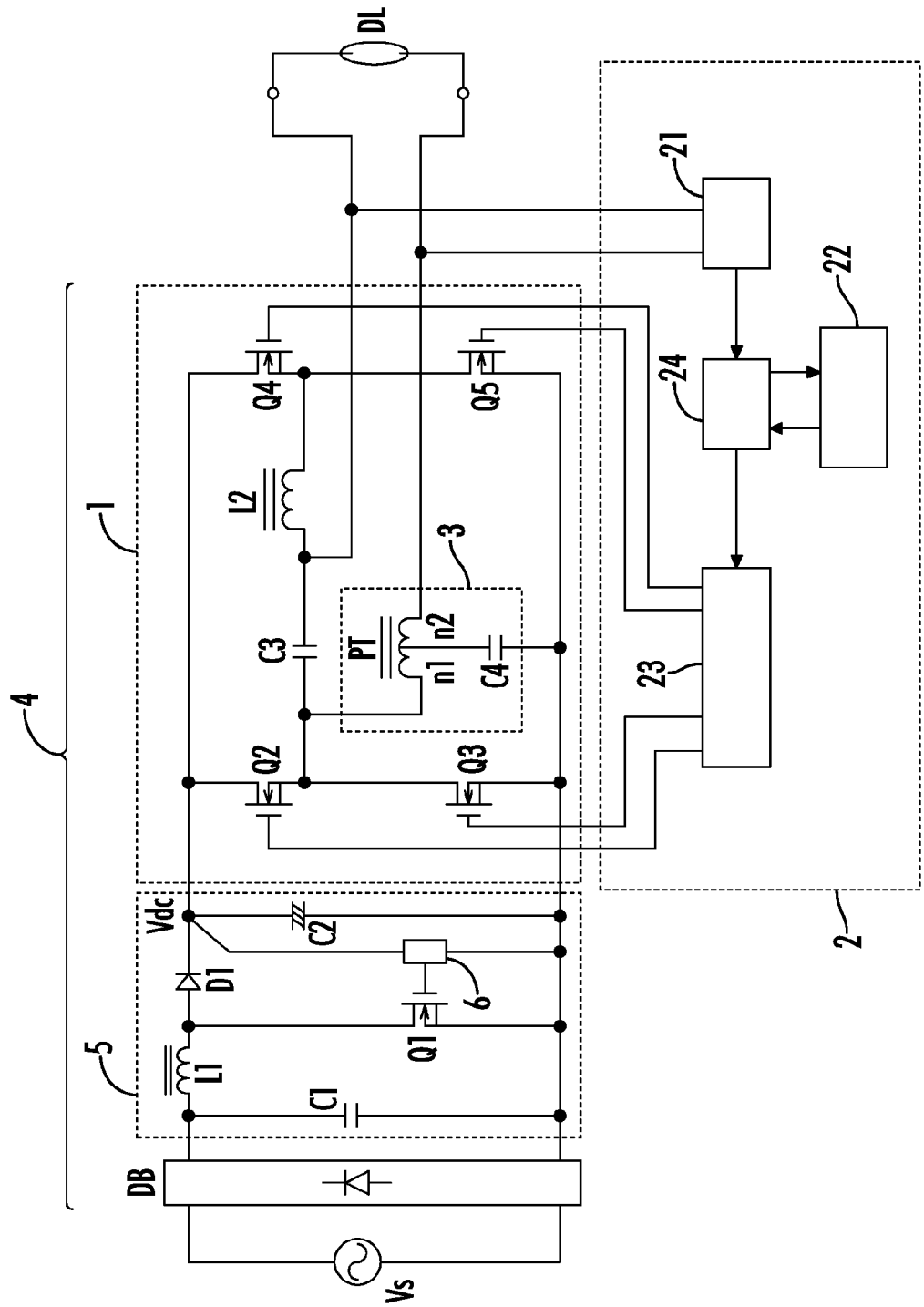
FIG. 1 is a circuit diagram of a first embodiment of the present invention.

FIG. 1 is a circuit diagram of an electronic ballast according to a first embodiment of the present invention. The ballast 4 includes a full-wave rectifying circuit DB, a step-up or boost chopper circuit 5 and an inverter circuit 1. The full-wave rectifying circuit DB can be a diode bridge circuit connected to a commercial AC power source Vs to rectify an AC voltage thereof and output a pulsating voltage. The step-up chopper circuit 5 receives the rectified voltage output of the full-wave rectifying circuit DB and outputs a stepped-up DC voltage Vdc. The inverter circuit 1 is controlled to step down the DC voltage Vdc and supply appropriate power and a rectangular wave AC voltage to the high-pressure discharge lamp DL connected to inverter output terminals. In addition, during lamp starting, a high frequency voltage is generated for driving a resonant starting voltage generation circuit 3.

The following describes one embodiment of the step-up chopper circuit 5. An input capacitor C1 is connected in parallel to output terminals of the full-wave rectifying circuit DB, and a DC circuit of an inductor L1 and a switching element Q1 is further connected thereto. A smoothing capacitor C2 is connected across the switching element Q1 via a diode D1. ON/OFF control of the switching element Q1 is executed by a step-up chopper control circuit 6. Thus, the ON/OFF control of the switching element Q1 is executed using a high frequency that is higer than the frequency of the commercial AC power source Vs. Therefore the output voltage of the full-wave rectifying circuit DB is stepped up to a regulated DC voltage Vdc that is supplied to the smoothing capacitor C2. Also, power factor improvement control is performed so that the phases of the input current and input voltage supplied from the commercial AC power source Vs do not substantially deviate from each other. It is noted that a filter circuit for preventing a leakage of a high frequency may be provided at AC input terminals of the full-wave rectifying circuit DB.

The inverter circuit 1 can be a full bridge circuit including switching elements Q2 to Q5, such as MOSFETs. A circuit of an inductor L2 and a capacitor C3 serving as an output filter is coupled between a connecting node of the switching elements Q2 and Q3 and a connecting node of the switching elements Q4 and Q5.

The high-pressure discharge lamp DL acting as a load when connected to the inverter output terminals can be a high-intensity and high-pressure discharge lamp (HID lamp) such as a metal halide lamp or a high-pressure mercury lamp.

The starting voltage generation circuit 3 is a resonant circuit including a pulse transformer PT and a capacitor C4. This circuit can generate a resonance step-up voltage applied to the lamp DL for lamp starting/restarting by high-frequency switching operation of the switching elements Q2 to Q5 of the inverter circuit 1, using the DC voltage Vdc as a power source.

A ballast control circuit 2 controls the switching elements Q2 to Q5 of the inverter circuit 1. The ballast control circuit 2 includes load voltage detection circuit 21 coupled to the inverter output terminals and adapted to detect load voltages of both positive and negative polarities applied to the lamp DL, a comparison and selection circuit 24 coupled to the load voltage detection circuit and adapted to compare absolute values of the positive and negative load voltages detected by the load voltage detection circuit 21, and a voltage-current (V-I) characteristic data table which can be stored in a memory 22 for determining load current to be provided thereafter according to the compared and selected load voltage by the comparison and selection circuit 24.

The ballast control circuit 2 further includes a switching control circuit 23 that may be coupled to the comparison and selection circuit 24. The switching control circuit 23 determines the lighting state of the lamp DL based on the load voltage detected by the load voltage detection circuit 21 so that the operation of the inverter circuit 1 is switched in a first operation period (starting mode) for generating a high voltage for starting the lamp DL and in a second operation period (lighting mode) for steady-state lighting of lamp DL. In the second operation period, the operating frequency and ON period of the switching elements Q4 and Q5 are determined as to obtain the load current determined by the V-I characteristic table 22 according to the load voltage of the lamp DL.

Upon turning on the commercial AC power source Vs, the chopper control circuit 6 executes ON/OFF control of the switching element Q1 of the step-up chopper circuit 5 at a frequency of several tens kHz. This controls the pulse width according to the DC voltage Vdc so that the DC voltage Vdc is kept constant at a prescribed value when the lamp DL is on and off. In addition, the step-up chopper circuit 5 increases the input power factor from the commercial AC power source Vs and suppresses input current distortion.

When the DC voltage Vdc reaches the prescribed value, the inverter circuit 1 is started. At this point, the lamp DL is off, that is, in an open or a high impedance state. At this time, the inverter circuit 1 starts operation in the first operating period (starting mode) for starting the lamp DL, and alternately drives the switching elements Q2 and Q5 and the switching elements Q3 and Q4 at a prescribed frequency f0 (about several hundreds kHz). This frequency f0 is nearly equal to a resonant frequency fr of a resonant circuit including a primary winding n1 of the pulse transformer PT and a capacitor C4, and a sinusoidal high voltage is generated in the primary winding n1. The sinusoidal high voltage generated in the primary winding n1 is boosted according to the turns ratio of the primary winding n1 and a secondary winding n2 of the pulse transformer PT and is then applied to the lamp DL via the capacitor C3. Thus, electrical breakdown occurs to start lamp DL.

When the lamp DL is started by a starting high voltage generated in the starting voltage generating period, the lamp DL is put into a low or short-circuit impedance state and therefore the load voltage of lamp DL is lowered to be almost 0V. When the load voltage of lamp DL as detected by the load voltage detection circuit 21 falls below a prescribed threshold of a lighting state voltage, the switching control circuit 23 determines that the lamp DL has started, and operation of the inverter circuit 1 is switched to the second operating period (lighting mode) for steady-state lighting of the lamp DL.

The inverter circuit 1 repeats the operation such that the switching elements Q2 and Q3 are alternately turned on and off at a prescribed low frequency fa (about several hundreds Hz) in the second operating period (lighting mode) wherein, regarding the switching elements Q4 and Q5, the switching element Q5 is turned on and off at a prescribed high frequency fb (about several tens kHz) in the ON period of the switching element Q2, and the switching element Q4 is turned on and off at a prescribed high frequency fb (about several tens kHz) in the ON period of the switching element Q3. By this inverter operation, a rectangular wave AC voltage at a frequency fa is applied to the lamp DL. Capacitor C3 and the inductor L2 act as a filter circuit for the inverter circuit, and reverse parallel diodes integral to the switching elements Q4 and Q5 act as diodes for providing a regeneration current.

The voltage across the lamp DL is low immediately after starting, and the voltage increases as the lamp arc tube enters a high temperature and high pressure state, and reaches a rated value for steady-state lighting. In the ballast control circuit 2, the load voltage of the lamp DL is detected by the load voltage detection circuit 21 so that a target value of load current is determined according to the detected load voltage referring to the V-I characteristic table 22. The switching frequency and ON period of the switching elements Q4 and Q5 are appropriately controlled to thereby supply a suited power to the lamp DL, resulting in stable lighting of the lamp DL.

Figure 2:
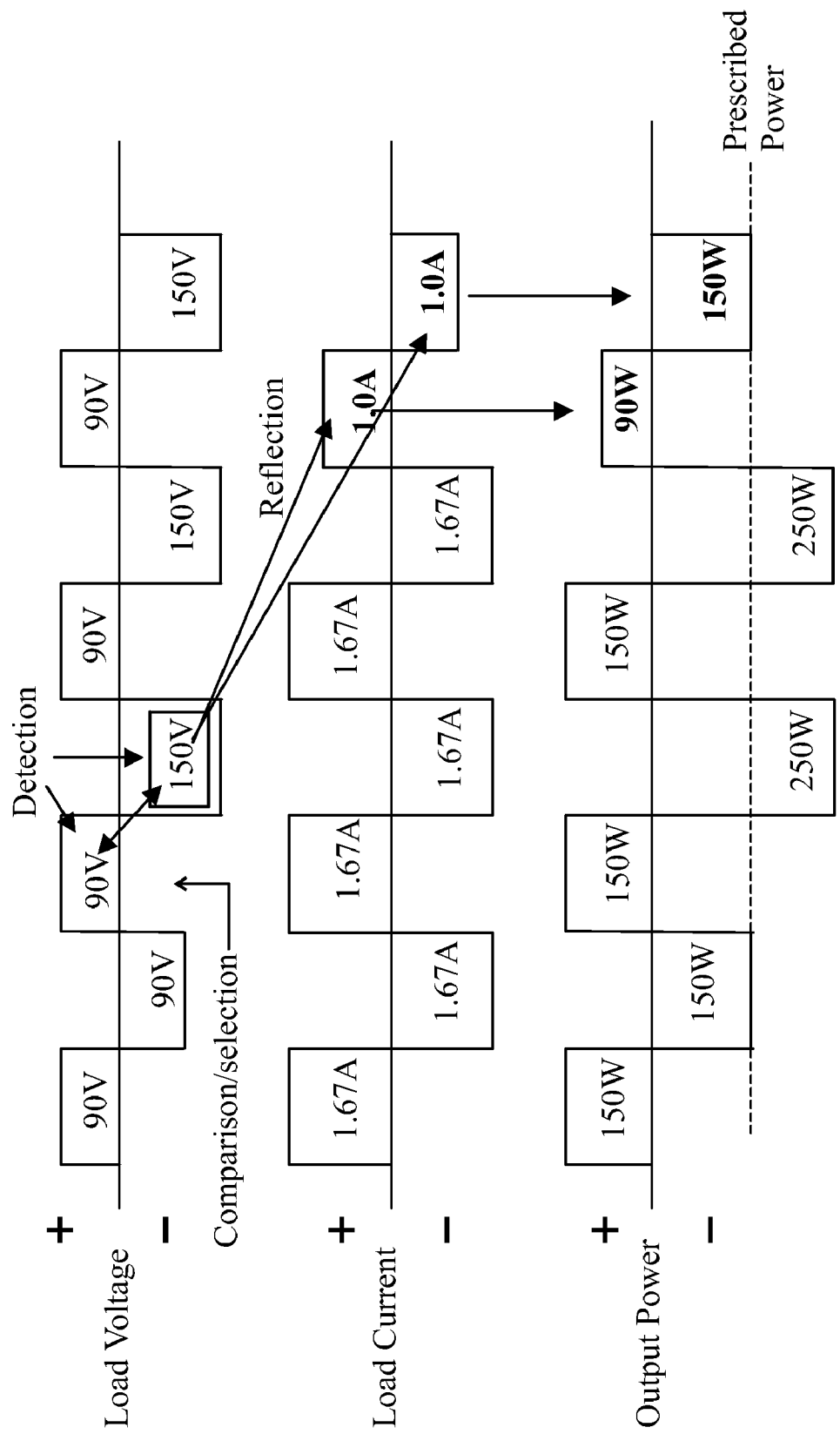
FIG. 2 is a functional explanatory view of a first embodiment of the present invention.

Using the ballast according to one embodiment as shown in FIG. 2, the following describes ballast operation when the difference between the positive and negative load voltages is large due to half-wave discharge (lamp rectification) or for other reasons. In a first step, the positive and negative load voltages (i.e., load voltage +V of positive polarity and load voltage −V of negative polarity) of lamp DL are respectively detected by the load voltage detection circuit 21. As one example, the following describes the case where the load voltage of a positive polarity is 90V and the load voltage of a negative polarity is 150V.

The absolute values |+V| and |−V| of the detected load voltages of the positive and negative polarities are compared to each other by the comparison and selection circuit 24. As a result of this comparison of the absolute values, one of the polarities is selected such that a smaller one of the target values of the load current to be provided thereafter is obtained referring to the V-I characteristic table 22.

Figure 10:
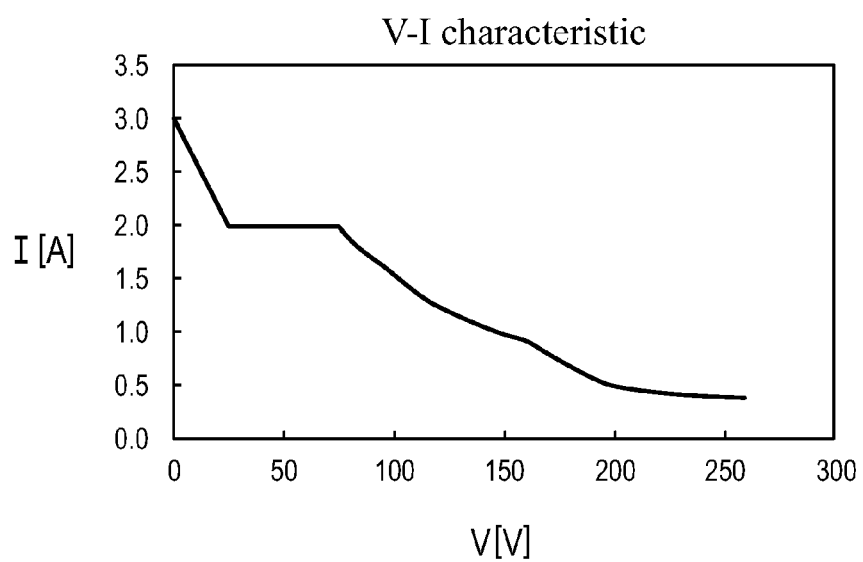
FIG. 10 is a graph showing voltage-current characteristics for use in some embodiments of the present invention.

In the case of the V-I characteristic table 22 as shown in FIG. 10, the characteristic indicates that the target value of the load current is decreased as the load voltage increases. However, in the case of using a different V-I characteristic table, a different characteristic may be obtained. In that case, it should be emphasized that one of the polarities is so selected as to obtain a smaller target value of the load current.

Referring to the V-I characteristic table 22 shown in FIG. 10, the target value of the load current is 1.67 A when the load voltage of positive polarity is 90V, and the target value of the load current is 1.0 A when the load voltage of negative polarity is 150V. Therefore, the load voltage 150V of negative polarity is selected in this example.

In the next step, in response to the load voltage of 150V of a negative polarity, a target value of load current of 1.0 A is provided in one cycle thereafter according to the V-I characteristic table 22. In the example shown in FIG. 2, although a target value of load current is reflected or adjusted in the second cycle after detecting the load voltage, it may be also possible to reflect or adjust in any cycle other than the second cycle. After the reflected cycle, because one of the polarities of the smaller target value of the load current is selected as described above, a lamp power output exceeding a prescribed output power is avoided.

Figure 3:
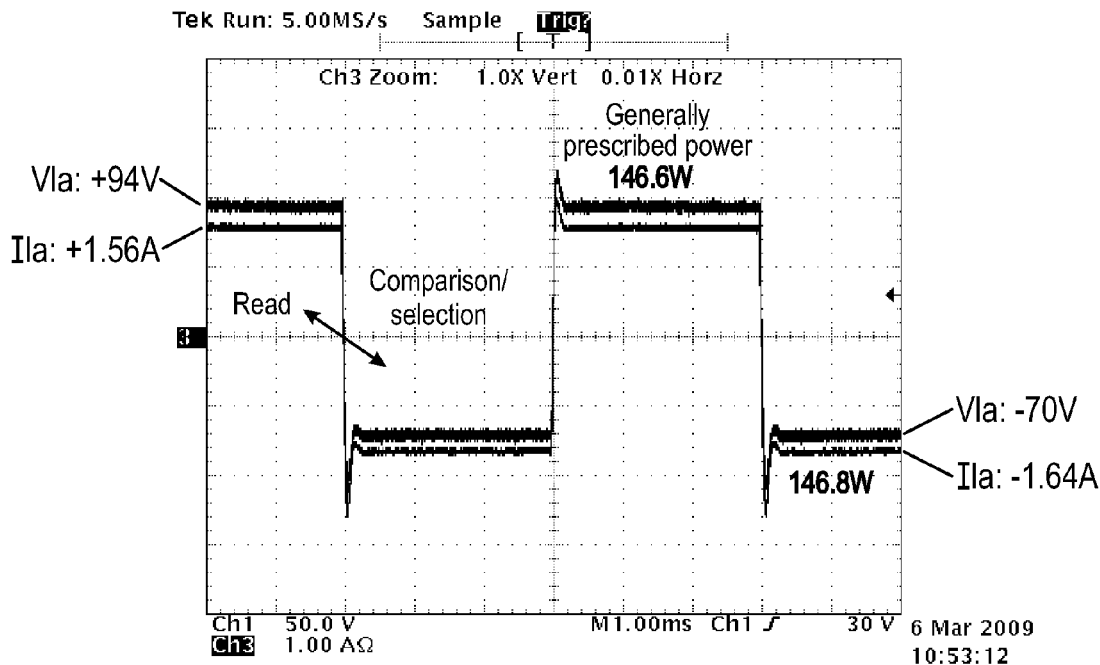
FIG. 3 is a waveform diagram showing load voltage and load current according to operation of the first embodiment of the present invention.
Figure 4:
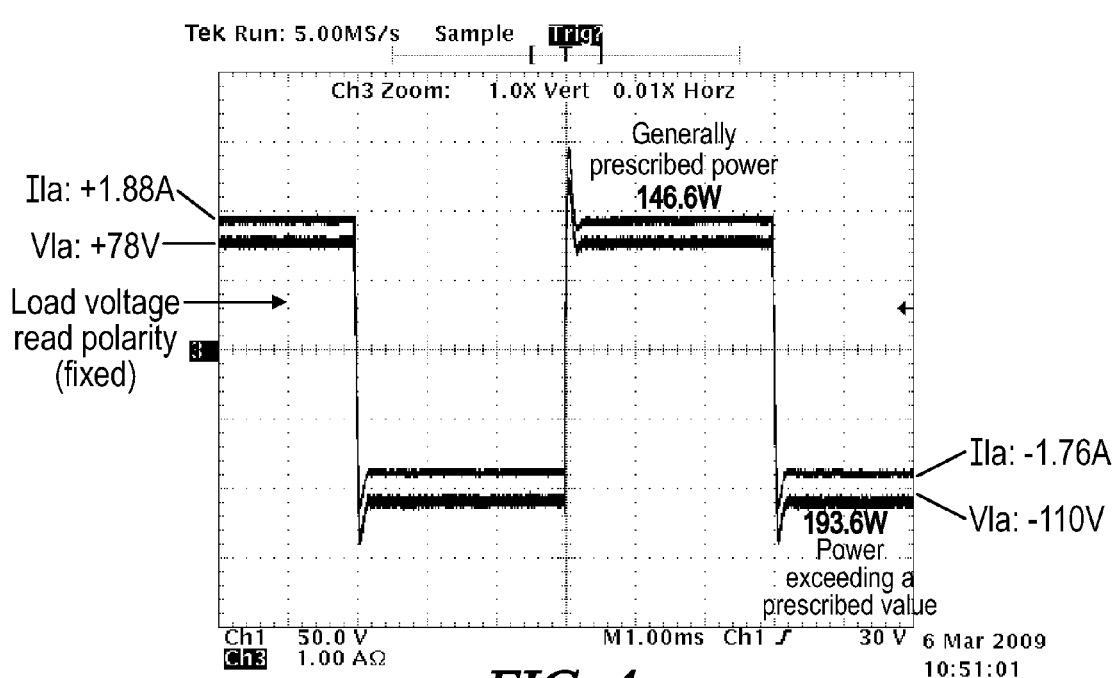
FIG. 4 is a waveform diagram showing load voltage and load current according to operation of a conventional ballast.

FIG. 3 shows waveforms of a practical load voltage and load current in the case of detecting load voltages of both the positive and negative polarities and selecting a polarity of higher one of the load voltages. In FIG. 3, Vla denotes load voltage and Ila denotes load current. In this example, there can be obtained a generally prescribed power in a period of positive polarity, and an output power within a prescribed power also in a period of negative polarity. Thus, breakdown of the ballast and reduction in life of the lamp DL can be prevented.

Note that, although a polarity having a smaller target value of load current is selected to prevent output power from being equal or greater than a prescribed value in consideration of preventing ballast failure or securing a longer lamp life, it may be possible to select a polarity having a larger target value of load current in order to improve other factors, such as half-wave discharge, if necessary.

Figure 5:
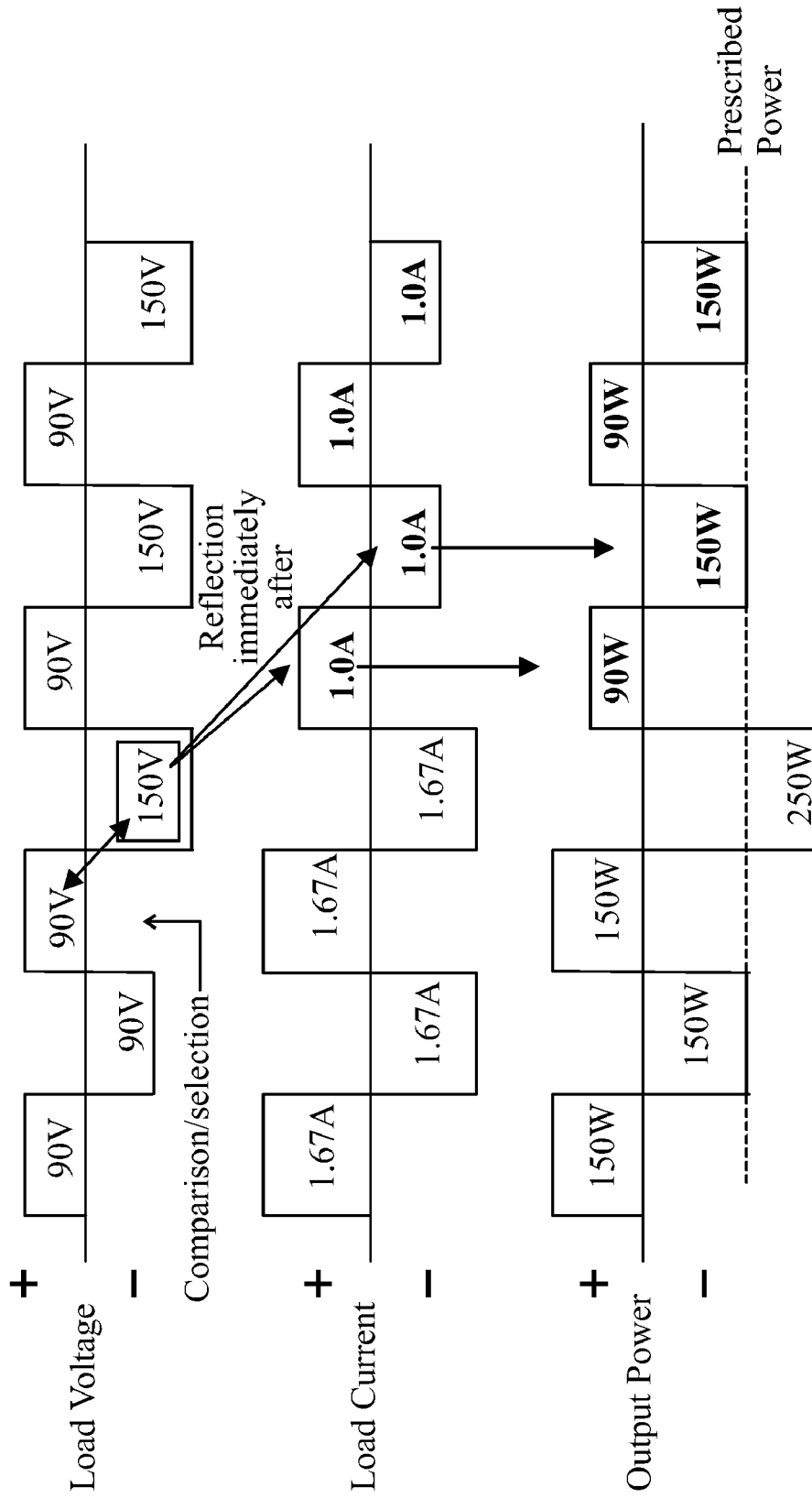
FIG. 5 is a diagram showing load voltage, load current, and load power illustrating operation of a second embodiment of the present invention.

FIG. 5 shows operation of a second embodiment of the present invention. The ballast circuit configuration may be same as that shown in FIG. 1. Similar to the first embodiment described above, the load voltages of both positive and negative polarities are detected by the load voltage detection circuit 21. One of the polarities is selected by the comparison and selection circuit 24 so that a smaller load current is selected to be provided, referring to the V-I characteristic table 22. Thus, the load current in accordance with the V-I characteristic table 22 is provided so that load current in accordance with the load voltage of the selected polarity is obtained. Although the above operation is the same as that of the first embodiment, the load current determined referring to the V-I characteristic table 22 is reflected or adjusted from a cycle immediately after detecting the load voltage and selecting one of the polarities. When comparing FIG. 2 and FIG. 5, it is seen that operation exceeding a prescribed power is reduced by one cycle. Thus, a situation where output power is equal to or greater than a prescribed value to lamp rectification can be promptly avoided.

Figure 6:
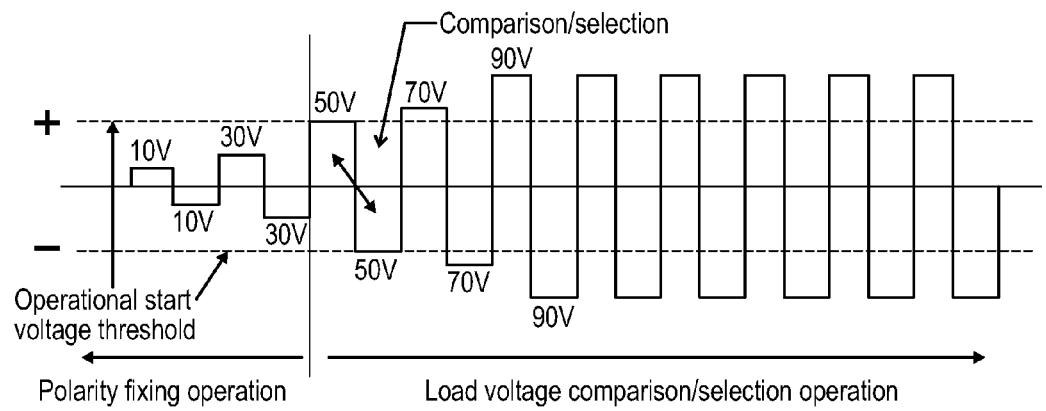
FIG. 6 is a functional explanatory view of a third embodiment of the present invention.

FIG. 6 shows operation of a third embodiment of the present invention. The ballast circuit configuration may be the same as that shown in FIG. 1. In the embodiment of FIG. 6, a further functional explanation is made with regard to timing of starting the comparison and selection operation, as described in the first or second embodiment. The lamp DL is started by applying a starting high voltage generated by the starting voltage generation circuit 3. As described above, the load voltage is low immediately after starting the lamp DL, and then the load voltage is gradually increased toward a rated lighting state. At this time, arc discharge of the lamp DL is not stable in a low voltage state immediately after starting, and half-wave discharge and flickering of the lamp for a short time may be repeated.

Therefore, in the third embodiment, the comparison and selection operation is started when the load voltages of both positive and negative polarities detected by the load voltage detection circuit 21 exceed a prescribed constant value. This prescribed constant value indicates load voltage in a way of transition from an unstable discharge state immediately after starting the lamp DL to a stable discharge state at a time of rated lighting. As one example, the comparison and selection operation may be started when the load voltage exceeds about 50V.

Although the comparison and selection operation of the load voltage is started when the load voltages of both positive and negative polarities exceed a prescribed constant value in consideration of preventing output power from exceeding a prescribed value in the third embodiment, it may be possible to select a polarity having a larger target value of load current in order to improve half-wave discharge, etc., as described in the first embodiment. In this case, to improve an unstable discharge state immediately after starting the lamp as opposed to the above case, the polarity having a larger target value of load current is compared and selected in the case of the load voltage being below a prescribed constant value (for example, below about 50V), and the selected value can be used to adjust the load current for one cycle thereafter.

Figure 7:
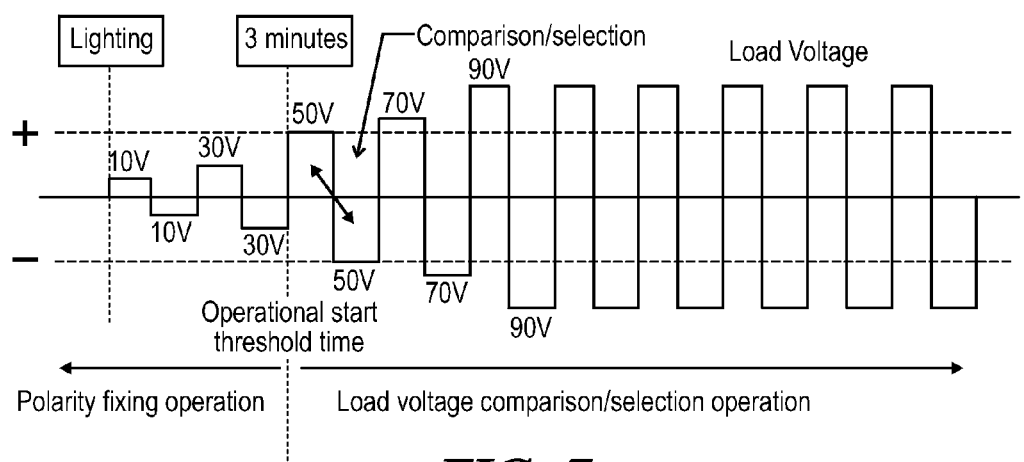
FIG. 7 is a functional explanatory view of a fourth embodiment of the present invention.

FIG. 7 shows operation of a fourth embodiment of the present invention. The ballast circuit configuration may be the same as that shown in FIG. 1. In the embodiment of FIG. 7, further explanation is made with regard to timing of starting the comparison and selection operation. In this embodiment, operation of the comparison and selection is started after a prescribed time elapses after the lamp is started. This prescribed time indicates a time period in a way of transition from an unstable discharge state immediately after starting the lamp DL to a stable discharge state at a time of rated lighting. As one example, the comparison and selection operation of may be started when about three minutes elapses after the lamp is started.

In the fourth embodiment, although the comparison and selection operation is started after a prescribed time elapses after starting in consideration of preventing output power from exceeding a predetermined value, the polarity having a larger target value of load current may be selected in order to improve a half-wave discharge, etc., as described in the first embodiment. In this case, as opposed to the case above, it may be also considered that the polarity having a larger target value of load current is compared and selected in the case within a prescribed time period (for example, within three minutes) after starting the lamp so that the selection value is reflected on the load current for one cycle thereafter to improve unstable discharge immediately after starting the lamp.

In a fifth embodiment, a further explanation is made with regard to a timing of starting the comparison and selection operation as described in the first or second embodiment. It is known that lamp rectification may continue due to deterioration of lamp starting capability and abnormal lamp discharge may continue due to tube deterioration as the lamp generally draws near end of life. Therefore, in another embodiment, a timer may be provided for measuring a cumulative lighting time of the lamp, and the comparison and selection operation is started after the cumulative lighting time of the lamp exceeds a prescribed time period.

This prescribed time period indicates a time period that may correspond to a breakdown of the lamp due to electrode wear or extended usage. As one example, the comparison and selection operation may be started when the cumulative lighting time exceeds a rated life of a high-pressure discharge lamp. Herein, the term "rated life" indicates a life time specified in, for example, a catalog and the like. As one example, in a case of Panasonic-manufactured MT150CE-LW-2, the rated life is specified as 12000 hours.

The circuit configuration may be the same as that shown in FIG. 1. For a timer for measuring a cumulative lighting time, although not shown, in the case where functions of the ballast control circuit 2 are implemented by a microprocessor with an EEPROM built-in, the cumulative lighting time can be measured by storing a cumulative counted value of the lighting time in the EEPROM. In the case of implementing functions of the ballast control circuit 2 by a microprocessor, the load voltage detection circuit 21 can be implemented by an A/D conversion input function, the V-I characteristic table 22 can be implemented by an arithmetic expression or a memory table, the comparison and selection circuit 24 can be implemented by a comparison and determination step of comparing values of numerals, and the switching control circuit 23 can be implemented by a control of a binary output port using a timer function. The load voltage detection circuit 21 may detect a voltage corresponding to load voltage through a resistor-divider or an operational amplifier. These functions can similarly be implemented in the other embodiments.

Figure 8:
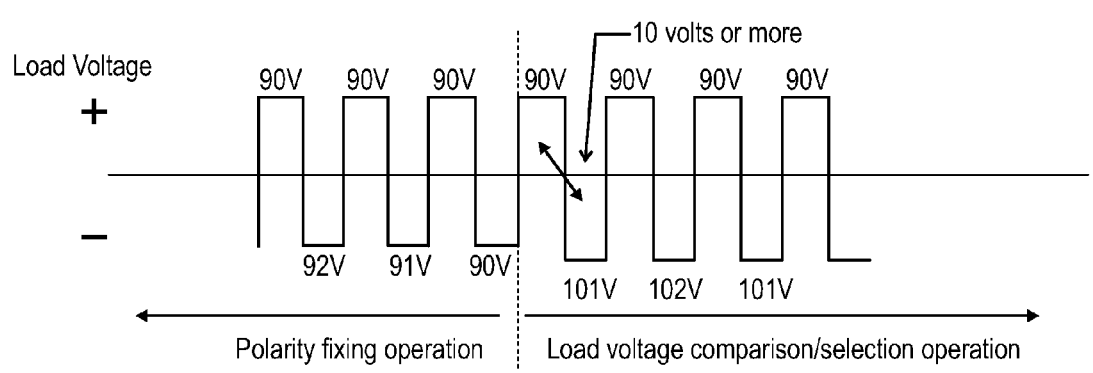
FIG. 8 is a functional explanatory view of a sixth embodiment of the present invention.
Figure 13:
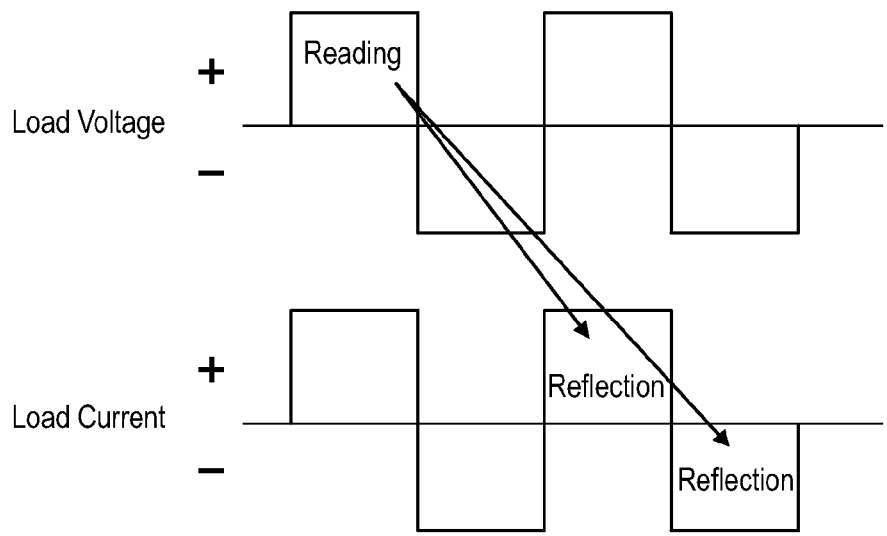
FIG. 13 is a functional explanatory view of a conventional electronic ballast during normal operation.
Figure 14:
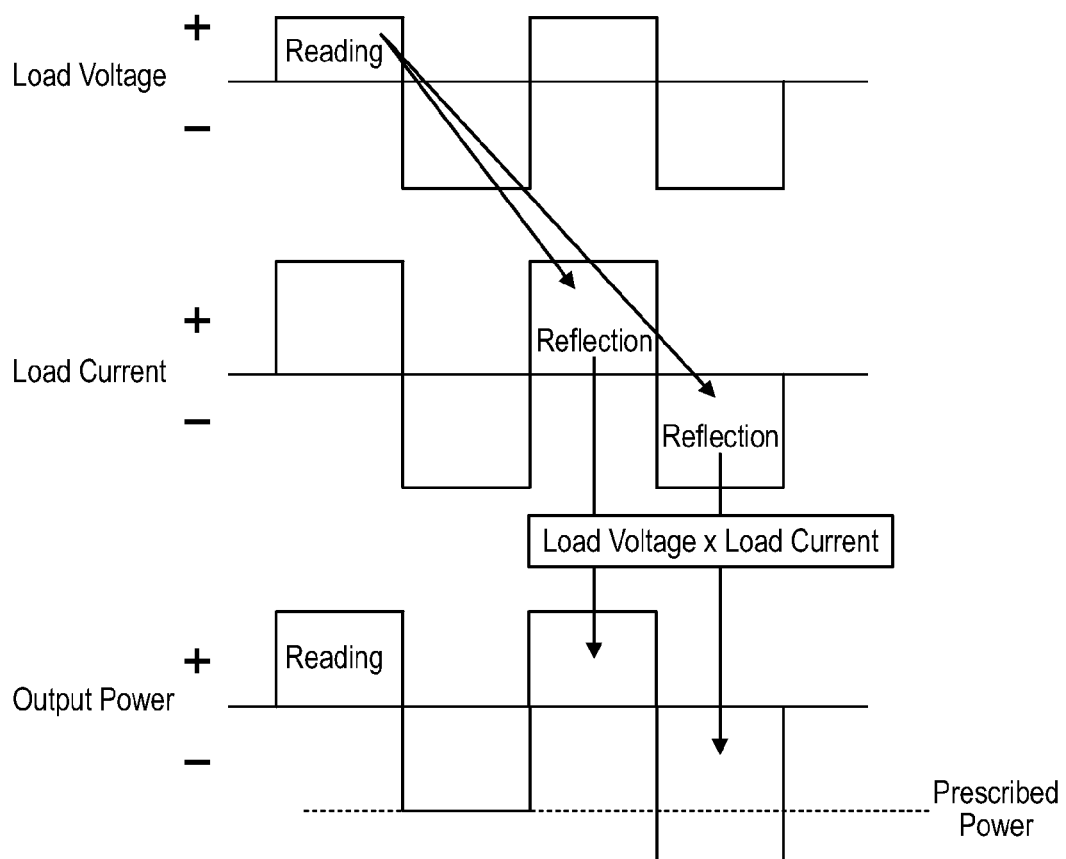
FIG. 14 is a functional explanatory view of abnormal operation of a conventional electronic ballast.

FIG. 8 shows operation of a sixth embodiment of the present invention. The ballast circuit configuration may be the same as that shown in FIG. 1. In the embodiment according to FIG. 8, further explanation is made with regard to a timing of starting the comparison and selection operation. In a state the lamp being lighted, there is usually little difference between load voltages of positive and negative polarities. In this state, lamp flickering can be prevented by equalizing the load current values flowing in one cycle both in the positive and negative polarities as in the conventional example shown in FIG. 13, even though there is little difference between the load voltages. On the contrary, in the case where a large difference exists between the load voltages, it indicates a somewhat abnormal discharge state as shown in FIG. 14.

Therefore, in this embodiment, the absolute values of the load voltages of the positive and negative polarities detected by the load voltage detection circuit 21 are compared to each other by the comparison and selection circuit 24. When the difference between the positive and negative polarities is equal to or greater than a prescribed value, the comparison and selection operation is started. Herein, the expression "equal to or greater than a prescribed value" indicates a difference between the positive and negative load voltages caused by an abnormal discharge condition. As one example, in the operation example shown in FIG. 8, the comparison and selection operation is started when the difference between the positive and negative load voltages is equal to or greater than 10V. If the difference between the positive and negative load voltages is less than 10V, the comparison and selection operation is stopped and operation similar to the conventional example as shown in FIG. 13 is performed, to thereby suppress flickering of the lamp.

Figure 9:
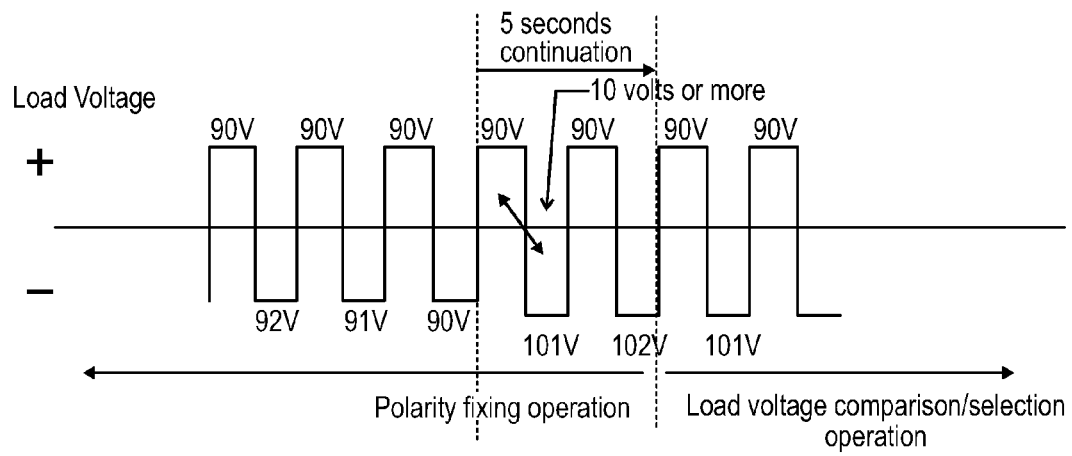
FIG. 9 is a functional explanatory view of a seventh embodiment of the present invention.

FIG. 9 shows operation of a seventh embodiment of the present invention. In this embodiment, operation according to the sixth embodiment is permitted in an abnormal discharge state for only a very short time, and the comparison and selection operation is started when the difference between the positive and negative load voltages equal to or larger than a prescribed value as described in the sixth embodiment is continued for a time period equal to or longer than a predetermined time.

Herein, the expression "equal to or longer than a predetermined time" indicates a time for removing a short time half-wave discharge (lamp rectification) usually caused at lamp starting and erroneous detection in monitoring the load voltages. As one example, in the example shown in FIG. 9, operation according to the first or second embodiment is started when a state of difference between the positive and negative load voltages being larger than 10V is continued for five seconds or longer. Thus, it is possible to prevent an excess output power from continuing for an extended time period that may cause breakdown of the lamp or ballast. When a state of the difference between the positive and negative load voltages is within 10V continues for a prescribed time or longer, the comparison and selection operation is stopped and operation as in the conventional example shown in FIG. 13 is performed to thereby suppress flickering of the lamp.

Figure 11A:
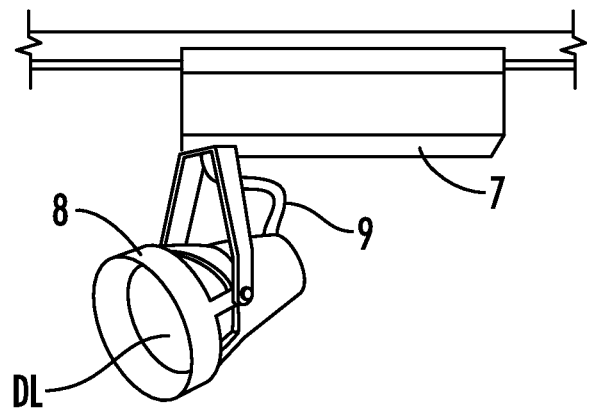
FIGS. 11(a), (b), and (c) are perspective views showing lamp fixtures according to an embodiment of the present invention.
Figure 11B:
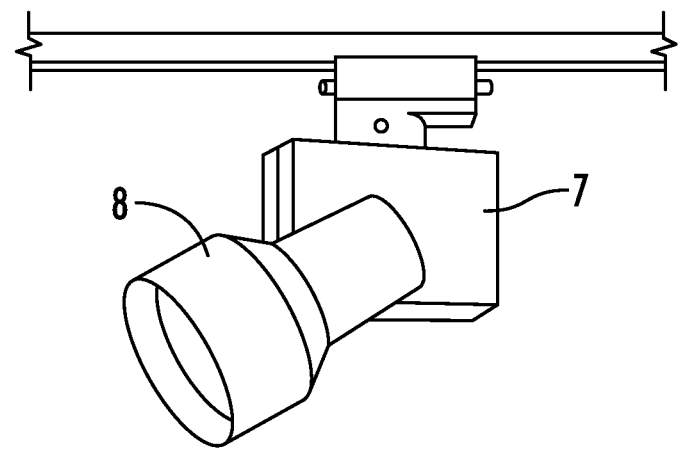
Figure 11C:
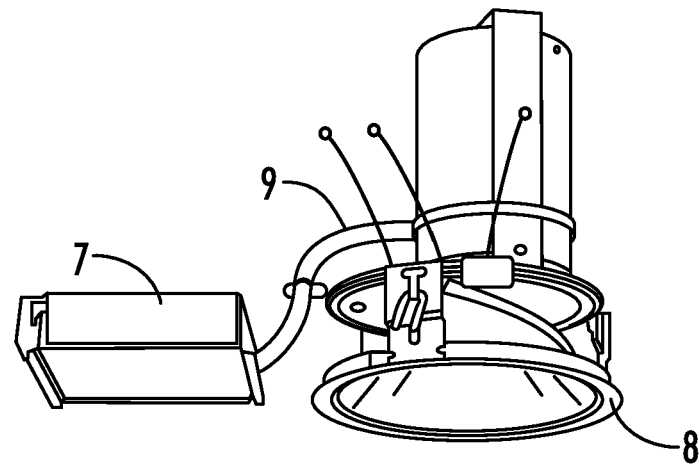
Figure 12:
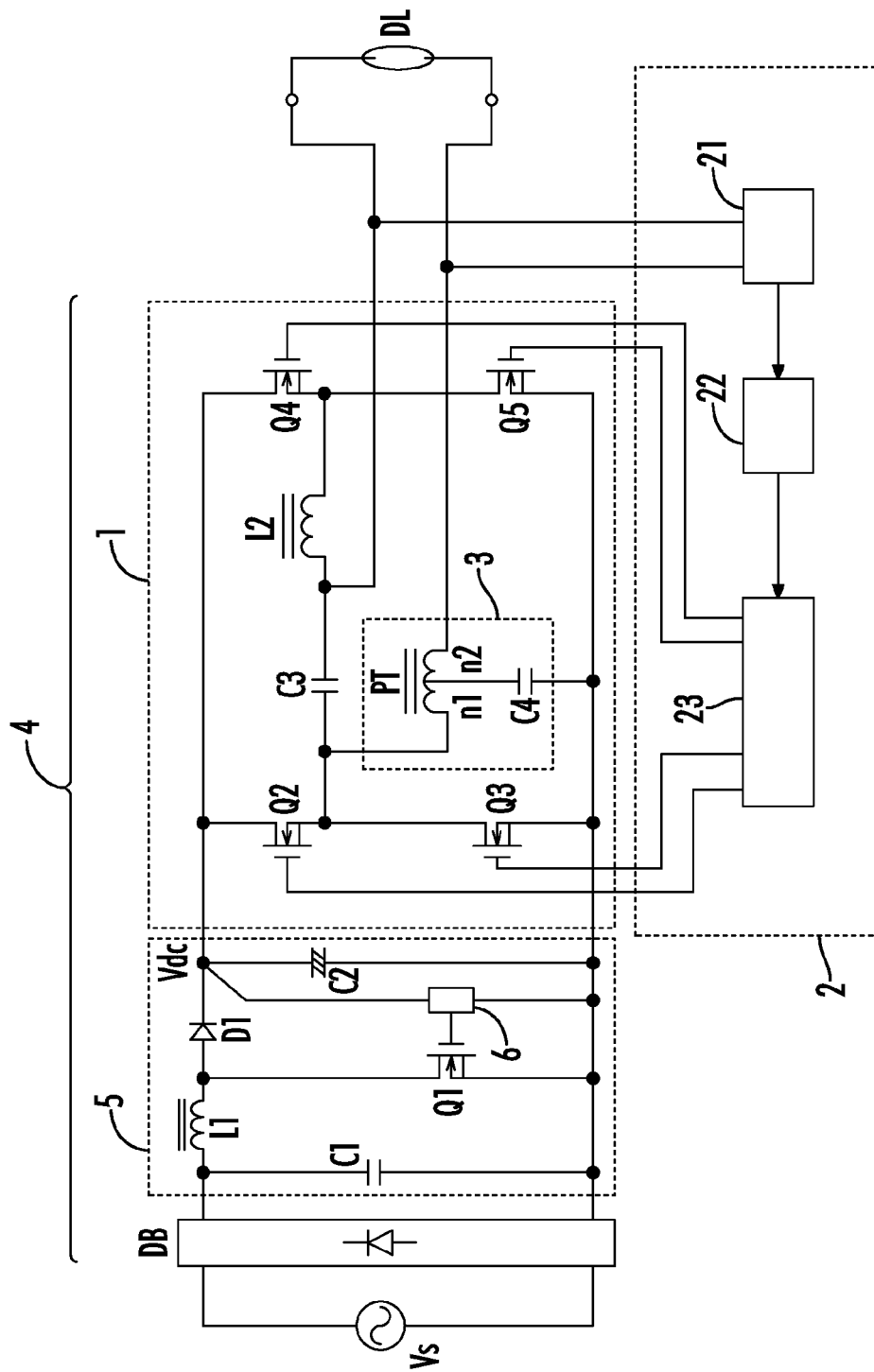
FIG. 12 is a circuit diagram of a conventional electronic ballast.

FIG. 11 shows examples of lamp fixtures using the ballast of the present invention. In FIG. 11, a high-pressure discharge lamp 7 is powered by a ballast according to the present invention that is contained in a ballast housing 7. The lamp DL is attached to a lamp body 8, which is electrically connected to the ballast by wiring 9. A plurality of these lamp fixtures may be combined to construct an illumination system. FIGS. 11(*a*) and 11(*b*) show examples of lamp fixtures for track lighting (spot or flood for example) and FIG. 11(*c*) shows an example using a high-pressure discharge lamp for a down light.

When the ballasts as described herein are used to power one or more HID lamps, lamp power can be controlled within a prescribed value, without stopping ballast operation even in an abnormal discharge state where the load voltages between the positive and negative polarities are largely different. Thus, it is possible to prevent a breakdown of the ballast and reduction in life of the high-pressure discharge lamp. In addition, in some embodiments, lamp rectification can be improved.

Thus, although there have been described particular embodiments of the present invention of a new and useful electronic ballast for HID lamps with active lamp power control it is not intended that such references be construed as limitations upon the scope of this invention except as set forth in the following claims.

What is claimed is:

1. A ballast for a discharge lamp comprising:
   an inverter circuit functional to convert DC power to supply a rectangular wave AC power at inverter output terminals to power a discharge lamp when connected to the inverter output terminals;
   a ballast control circuit coupled to the inverter circuit and functional to control the inverter circuit; and
   the ballast control circuit comprising:
      a load voltage detection circuit coupled to the inverter output terminals and functional to detect load voltages of both positive and negative polarities when applied to a high-pressure discharge lamp, a comparison and selection circuit coupled to the load voltage detection circuit and functional to compare the detected load voltages of the positive and negative polarities and to select one of the positive and negative polarities, and a switching control circuit coupled to the comparison and selection circuit and functional to respond to the load voltage of the polarity selected by the comparison and selection circuit to control load current in one cycle after a period of detecting the load voltages of both the positive and negative polarities, wherein the load current is controlled as a function of the load voltage of the polarity selected by the comparison and selection circuit.

2. The ballast of claim 1, wherein the one cycle after the period of detecting the load voltages of both the positive and negative polarities is a period of one cycle immediately after monitoring the load voltages of the positive and negative polarities and selecting one of the positive and negative polarities.

3. The ballast of claim 1, wherein the comparison and selection circuit selects one of the polarities so as to decrease the load current determined in accordance with the selected load voltage.

4. The ballast of claim 1, wherein the comparison and selection circuit selects a polarity corresponding to a higher one of the load voltages.

5. The ballast of claim 1, wherein the comparison and selection circuit is operated when the load voltages of the positive and negative polarities are equal to or larger than a prescribed value.

6. The ballast of claim 1, wherein the comparison and selection circuit is operated after a prescribed time after a lamp connected to the inverter output terminals is started.

7. The ballast of claim 1, wherein the comparison and selection circuit is operated when a cumulative lighting time for a lamp connected to the inverter output terminals is equal or greater than a prescribed time.

8. The ballast of claim 1, wherein the comparison and selection circuit is operated when a difference between the load voltages of the positive and negative polarities is equal to or larger than a prescribed value.

9. The ballast according to claim 8, wherein the comparison and selection circuit is operated when a state of the difference between the load voltages of the positive and negative polarities being equal to or larger than the prescribed value is continued for a period equal to or longer than a prescribed time period.

10. A lamp fixture comprising a lamp and a ballast according to claim 1.

* * * * *